US012594576B2

(12) United States Patent
Tschudy

(10) Patent No.: US 12,594,576 B2
(45) Date of Patent: Apr. 7, 2026

(54) REMOVABLE CLOSURE CAP FOR CONTAINERS CONTAINING AIR-CURABLE MATERIAL

(71) Applicant: Peter Walter Tschudy, Montclair, NJ (US)

(72) Inventor: Peter Walter Tschudy, Montclair, NJ (US)

( * ) Notice: Subject to any disclaimer, the term of this patent is extended or adjusted under 35 U.S.C. 154(b) by 0 days.

(21) Appl. No.: 19/076,844

(22) Filed: Mar. 11, 2025

(65) Prior Publication Data

US 2025/0289022 A1 Sep. 18, 2025

Related U.S. Application Data

(60) Provisional application No. 63/564,506, filed on Mar. 13, 2024.

(51) Int. Cl.
*B05C 17/005* (2006.01)
*B65D 41/02* (2006.01)

(52) U.S. Cl.
CPC ........ *B05C 17/0052* (2013.01); *B65D 41/023* (2013.01)

(58) Field of Classification Search
CPC .... B65D 47/12; B65D 41/023; B65D 47/122; B65D 47/148; B05C 17/0052; B05C 17/00516; B05C 17/00596
USPC .......................................... 222/543, 546, 562
See application file for complete search history.

(56) References Cited

U.S. PATENT DOCUMENTS 3,021,942 A * 2/1962 Hamilton ............ A61M 5/3202 604/243
3,486,503 A * 12/1969 Merchlewitz ....... A61M 3/0279 222/215
4,284,213 A 8/1981 Lee
4,413,753 A * 11/1983 Stock ..................... B65D 41/18 222/149
4,571,410 A 2/1986 Nevins et al.
4,846,801 A * 7/1989 Okuda .................. A61M 31/00 604/218
5,014,492 A 5/1991 Fiorini et al.
5,053,020 A * 10/1991 Manchester ............. A61D 1/02 604/117

(Continued)

FOREIGN PATENT DOCUMENTS

GB 1010541 A 11/1965
WO 2008155044 A1 12/2008
WO 2010023798 A1 3/2010

*Primary Examiner* — Charles P. Cheyney
(74) *Attorney, Agent, or Firm* — Thomas F. Woolf

(57) ABSTRACT

The invention is directed to a removable and reusable closure cap and method of use to provide a force-fit or press-fit grip seal to a cut nozzle end or applicator tip of a container containing an air-curable flowable material. The cap allows for storage within and intermittent use of the flowable material. The cap has opposing wings or handles on the outer surface. The inner surface can be either a rough inner surface or a series of internal annular grip rings. The opposing wings or handles allow a user to apply pressure to the cap when attaching it to the cut nozzle end of the container to allow for a force-fit or press-fit grip seal within the container. To remove the cap, the application of a pulling force breaking the force-fit or press-fit grip seal, allowing for easy removal of the cap.

17 Claims, 8 Drawing Sheets

(56) References Cited

U.S. PATENT DOCUMENTS

| | | | | |
|---|---|---|---|---|
| 5,104,013 | A * | 4/1992 | Hawley | B65D 35/38 401/265 |
| 5,154,327 | A * | 10/1992 | Long | B05C 17/00596 222/326 |
| 5,248,071 | A * | 9/1993 | Ray | B65D 47/122 222/566 |
| 5,295,601 | A * | 3/1994 | Bostelman | B65D 41/04 215/390 |
| 6,375,051 | B1 | 4/2002 | Iverson | |
| 6,510,675 | B1 | 1/2003 | Strassler | |
| 6,574,946 | B1 | 6/2003 | Linner | |
| 6,824,026 | B1 * | 11/2004 | Boutwell | B05C 17/00516 222/326 |
| 9,131,991 | B2 * | 9/2015 | Walter | A61C 5/50 |
| 9,475,625 | B2 | 10/2016 | Di Molfetta | |
| 9,517,863 | B2 | 12/2016 | Robinson et al. | |
| 11,001,417 | B1 | 5/2021 | Nenninger | |
| 11,014,057 | B2 | 5/2021 | Hudson | |
| 11,111,057 | B2 | 9/2021 | Patel | |
| D941,103 | S | 1/2022 | Skelton et al. | |
| D982,400 | S | 4/2023 | Folley | |
| D982,401 | S | 4/2023 | Weber et al. | |
| 2003/0127472 | A1 * | 7/2003 | Doherty | B65D 1/095 222/541.5 |
| 2004/0226968 | A1 * | 11/2004 | Lafond | B05C 17/00513 222/327 |
| 2009/0032536 | A1 * | 2/2009 | Hobbs, Sr. | B65D 41/023 220/287 |

* cited by examiner

REMOVABLE CLOSURE CAP FOR CONTAINERS CONTAINING AIR-CURABLE MATERIAL

FIELD OF THE INVENTION

The invention relates to the discovery of a novel removable closure cap for a cut applicator tip or nozzle end of containers for air-curable material and is particularly directed toward a removable closure cap for caulking cartridges, tubes, or similar dispensers. The removable closure cap comprises an inner surface and an outer surface. The inner surface can have either a series of internal annular grip rings or a rough inner surface having an upper portion, a middle portion, and a lower portion. The outer surface has two opposing wings or handles to allow a force-fit application of the cap to the applicator tip or nozzle end of the container, preferably a caulking tube, when a user applies pressure and twist on the wings or handles, thereby forming an airtight seal for closure of the container. The cap is removable by application of a pulling force on the wings or handles, thereby breaking the airtight seal, allowing for the cap to be removed from the applicator tip or nozzle end of the container. The cap can be used multiple times with the same or additional containers to allow efficient use of the remaining air-curable material.

BACKGROUND OF THE INVENTION

Caulk, sealants, construction adhesives, and other similar flowable materials are dispensed from a disposable container having an applicator tip or nozzle at one end. Disposable containers include cylindrical cartridges or tubes made of rigid cardboard, plastic, or similar materials. The applicator tip or nozzle end is made of a plastic or similar material having a tapered tip that can be cut off at a point along the tip to provide the desired orifice size for dispensing the flowable material. A caulking gun is generally used to apply caulk, sealants, construction adhesives, and other similar materials from disposable cylindrical cartridges after the applicator tip or nozzle end is cut. In the case of tubes, the flowable material can be dispensed by squeezing the tube after the applicator tip or nozzle end is cut.

Caulk, sealants, construction adhesives, and other similar flowable materials are designed to cure upon contact with air to form a rigid or semi-rigid mass to seal the area to which the flowable material has been applied. To prevent curing of the flowable material in the cartridge prior to use, the cartridges or tubes are factory sealed. After the applicator tip or nozzle end is cut and the flowable material applied, the unused flowable material in the cartridge is exposed to air, thereby curing the flowable material first in the applicator tip or nozzle and gradually into the cartridge. The result is that the unused flowable material within usually cures or sets or otherwise becomes unusable after prolonged exposure to the atmosphere (see U.S. Pat. No. 11,001,417 B1).

Bostelman (U.S. Pat. No. 5,295,601) discloses a caulk cartridge cap that is designed to enable the storage of unused portions of products of the types supplied within caulk cartridge-type containers to maintain them in a reusable condition. The cap includes an orifice retention rod which is positioned within the applicator tube, and a self-threading insert which is positioned within the cap to attach the cap to the cartridge.

Iverson (U.S. Pat. No. 6,375,051) discloses a caulk storage and dispensing system that has a reusable sealing device. The reusable sealing device has a threaded portion imposed on a pin section. The threaded portion seals the caulk dispensing container and assists in removing the reusable sealing device from the caulk dispensing container. The reusable sealing device also forms a seal with the caulk. The caulk dries or hardens around the threaded portion, thus sealing the caulk dispensing container and forming a screw hole. The reusable sealing device may be "unscrewed" from the dry or hardened caulk, leaving a channel for caulk to pass.

Molfetta (U.S. Pat. No. 9,475,625) discloses a closure system for resealing a caulking tube nozzle of a caulking tube. The closure system comprising a hollow adaptor configured to be removably secured to the caulking tube nozzle, the hollow adaptor comprising (1) a first open end for securely receiving the caulking tube nozzle, (2) a second open end and a passageway extending there between; and a (3) plug for sealing the second open end to prevent caulking from exiting the passageway through the second open end.

Nenninger (U.S. Pat. No. 11,001,417) discloses a reusable sealing system provided for a caulking tube or similar bulk dispenser. A sealing system forms a cylindrical, pliable member having an access orifice at the proximal end and a sealed dome at the opposite, distal end. The sealed dome is formed as a flattened extension of a pliable sidewall. A pliable sidewall is formed of a resilient elastomeric material, such as silicone or plastic, and is adapted to receive and encase a tip of the nozzle of a caulk tube or similar flow-gun bulk dispenser device in a contiguously contacting manner.

The above-mentioned caulk removable closure systems each have drawbacks, including ease of use, complexity, and cost. There exists a need for a caulk removable closure system or cap that is small, efficient, inexpensive, easy to use, and capable of securing a portion of the caulk or similar material in situ within its original container.

SUMMARY OF INVENTION

The object of the present invention is to provide a removable and reusable closure cap suitable for forming a force-fit or press-fit grip seal of a cut nozzle end or applicator tip of a container, preferably a caulking tube, that holds flowable materials by application of pressing force or a pressing force and twist. The closure cap force-fit grip seal can be broken by applying a pulling force or a pulling force and twist. The closure cap can be used several times to form a force-fit grip seal with the same open nozzle end or applicator tip of the container or can be used on different containers having an open nozzle end or application tip. In particular, the invention is directed to a removable and reusable closure cap for a cut nozzle end or applicator tip of containers containing air-curable flowable material, such as caulking cartridges and tubes or similar dispensers.

It is a feature of the present invention to provide a removable and reusable closure cap of an open nozzle end or applicator tip of a container holding a flowable material that allows storage within and intermittent use of the flowable material. In particular, the flowable material is air-curable, such as caulking, adhesives, sealants, and the like.

In one embodiment, the cap comprises an outer surface and a rough inner surface. The outer surface comprises a tapered upper cylindrical portion with a closed top end and two opposing wings or handles, and an open bottom end capable of receiving a cut nozzle end or applicator tip of the container that holds the air-curable flowable material. The rough inner surface of the cap allows for a force-fit or press-fit grip airtight seal of the cap to the cut nozzle end or applicator tip of a container containing air-curable flowable material when a user applies a pressing force or a pressing force and twist on the wings or handles of the outer surface of the cap. The rough inner surface of the cap comprises concentric peaks. The cap is removable from the cut nozzle or applicator tip of the container containing air-curable flowable material by application of a pulling force or a pulling force and twist on the wings or handles thereby breaking the airtight seal to allow the remaining air-curable flowable material in the container to be applied to a work surface. The cap can be reapplied to the nozzle end or applicator tip of the container to allow any remaining air-curable flowable material to be used in subsequent applications. The cap is designed to be used multiple times on multiple containers having a nozzle end or applicator tip. In particular, the cap can be used to seal the nozzle end of caulking tubes or cylinders.

In another embodiment, the cap comprises a tapered cylindrical outer surface with two opposing wings or handles and an open bottom portion; a cylindrical inner surface having a series of internal annular grip rings that decrease in diameter from the base of the opposing wings or handles to the top of the cap. The open bottom end of the cap is capable of receiving a cut nozzle end or applicator tip of a container, preferably a caulking tube, which holds an air-curable flowable material. The internal annular grip rings allow for a force-fit or press-fit airtight seal of the cap to the cut nozzle end or applicator tip of a container containing air-curable flowable material when a user applies a pressing force or pressing force and twist on the wings or handles of the outer surface of the cap. The cap is removable from the cut nozzle or applicator tip of the container containing air-curable flowable material by application of a pulling force or a pulling force and twist on the wings or handles, thereby breaking the airtight seal to allow the remaining air-curable flowable material in the container to be applied to a work surface. The cap can be reapplied to the nozzle end or applicator tip of the container to allow any remaining air-curable flowable material to be used in subsequent applications. The cap is designed to be used multiple times on multiple containers having a nozzle end or applicator tip. In particular, the cap can be used to seal the nozzle end of caulking tubes or cylinders.

DETAILED DESCRIPTION OF THE INVENTION

Definitions

Figure 1:
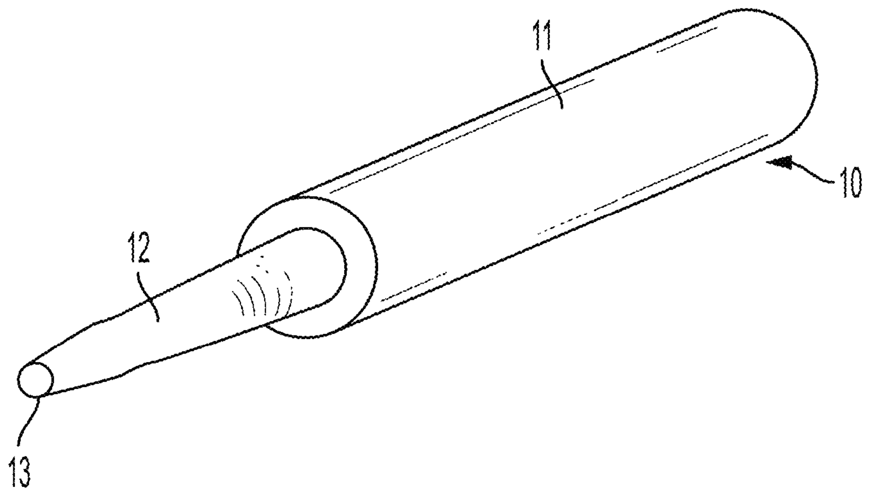
FIG. 1 shows a perspective view of a commonly used caulking cartridge comprising a compartment for storing caulk, construction adhesives, and other similar materials and a nozzle end or applicator tip.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Unless otherwise defined, all technical and scientific terms used herein have the same meaning as commonly understood by one of ordinary skill in the art to which this invention pertains. In the case of conflict, the present document, including definitions will control.

The terms "caulk" or "caulking materials" include bulk liquid construction materials such as caulking, sealants, adhesives, or the like, that when exposed to air undergo a chemically curing process to achieve their final composition and physical form. Most caulks are made up of acrylic, latex, silicone, polyurethane, or a combination thereof. Caulk is used to infill gaps, to seal, and to glue.

The terms "wings" or "handles" refer to attachments on the removable and reusable closure cap that allow a user to apply downward pressure and twist while applying the cap to an open end of an applicator tip or nozzle of a caulking tube holding unused caulk. The wings or handles also allow easy removal of the cap from the open end of the applicator tip or nozzle when the user wishes to apply the remaining caulk.

The terms "roughness" or "rough" refer to an uneven or non-smooth surface area formed by concentric peaks like those formed by 3D printing. In the case of the presently disclosed removable and reusable cap, the rough inner surface area of the removable and reusable cap allows for a force-fit grip airtight seal between the removable and reusable cap and a cut nozzle end or applicator tip of caulking tube or container that holds air-curable flowable material.

The term "force-fit" refers to the use of force to make one part pressed by force into another to form a single unit.

The terms "internal annular barbs" or "internal annular grip rings" or "internal annular ridges" or "internal annular grip ridges" refer to the raised portions on the inside surface of the cap that provide for a force-fit connection of the cap to the nozzle or applicator tip of a container or caulking tube. The internal annular barbs are similar in function to barbs on a barbed hose fitting, except that the barbs are on the inside instead of the outside.

The phrase "and/or" as used herein, should be understood to mean "either or both" of the elements so conjoined, i.e., elements that are conjunctively present in some cases and disjunctively present in other cases.

As used herein, "or" should be understood to have the same meaning as defined above for "and/or." For example, when separating a listing of items, "and/or" or "or" shall be interpreted as being inclusive, i.e., the inclusion of at least one, but also potentially more than one of a number of items, and, optionally, additional unlisted items. Only terms clearly indicated to the contrary, such as "only one of" or "exactly one of," or, when used in the claims, "consisting of," will refer to the inclusion of exactly one element of a list of elements. In general, the term "or" as used herein shall only be interpreted as indicating exclusive alternatives (i.e., "one or the other but not both") when preceded by terms of exclusivity, such as "either" "one of," "only one of," or "exactly one of."

The term "about" means a range of values including the specified value, which a person of ordinary skill in the art would consider reasonably similar to the specified value. In embodiments, "about" means within a standard deviation using measurements generally acceptable in the art. In embodiments, "about" means a range extending to plus or minus (+/−) 10% of the specified value. In embodiments, "about" includes the specified value.

Throughout the description and claims of this specification, the word "comprise" and variations of the word, such as "comprising" and "comprises," means "including but not limited to," and is not intended to exclude, for example, other additives, components, integers, or steps.

The term "consisting of" means including, and limited to, whatever follows the phrase "consisting of." That is, "consisting of" indicates that the listed elements are required or mandatory, and that no other elements may be present.

The term "consisting essentially of" indicates that any elements listed after the phrase are included, and that other elements than those listed may be included provided that those elements do not interfere with or contribute to the activity or action specified in the disclosure for the listed elements.

Certain preferred embodiments of the removable and reusable closure cap are disclosed with reference to the accompanying drawings, in which like elements are identified by like reference numerals within the drawings. It is to be understood that the disclosed drawings are nonlimiting in nature and represent preferred embodiments. It is to be understood that variations and modifications may be made and are considered to still fall within the concept of the present invention.

FIG. 1 shows a side perspective view of a standard caulking cartridge 10. The caulking cartridge 10 comprises a cylindrical body compartment 11 for storing caulk, sealants, construction adhesives, and other similar flowable materials; a plastic end that force by a caulking gun (not shown) can be applied to; and a nozzle end or applicator tip 12, wherein the nozzle end or applicator tip 12 comprises a straight cylindrical portion attached to the cylindrical body compartment 11, and a closed or sealed frustoconical end portion 13, located away from the cylindrical body compartment 11.

Figure 2:
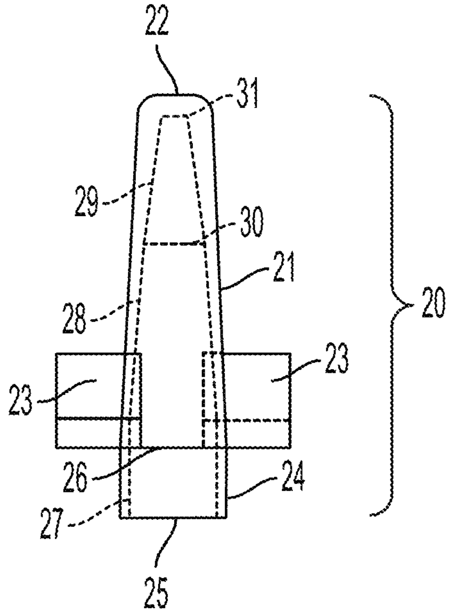
FIG. 2 shows a front view of a removable and reusable cap with wings or handles. Broken lines show the interior service of the cap and the back portion of the wings.

FIG. 2 shows a front view of a removable and reusable closure cap 20, comprising a tapered outer upper cylindrical portion 21 with a closed top end 22, two opposing wings or handles 23, a lower outer portion 24 of uniform diameter below the opposing wings or handles 23, with an open bottom end 25 capable of receiving the nozzle end or applicator tip of a caulking cartridge. The wings or handles 23 allow a user to apply pressure and twist to form a force-fit or press-fit grip airtight seal between the cap 20 and a cut nozzle end or applicator tip 12, of a caulking cartridge 10. The wings or handles 23 also allow easy removal of the cap from the cut nozzle end or applicator tip by the user.

The inner surface of cap 20, denoted by broken lines, has a lower cylindrical portion 27, of uniform diameter below the opposing wings or handles 23, a tapered cylindrical middle portion 28, having a diameter at the bottom end 26, equal to the diameter of the lower cylindrical portion 27, and diameter at the top end 30, less than the diameter at 26, and a tapered cylindrical upper portion 29, with a diameter at the bottom end 30, and a cylindrical closed top end 31, with a diameter less than the diameter 30. The inner surface has a rough, not smooth, texture (not shown) that allows for a force-fit or press-fit grip airtight seal when applied by force to the nozzle end or applicator tip of a container, preferably where the container is a caulking tube. The force-fit seal provides a grip with the nozzle end or applicator tip of the container that prevents the cap from detaching.

Figure 3:
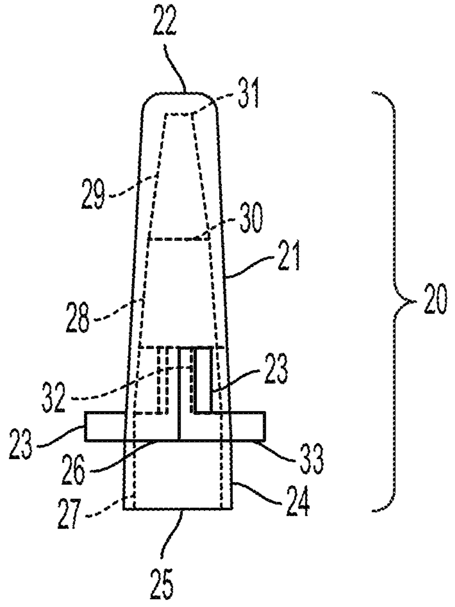
FIG. 3 shows a side view of the removable and reusable cap with wings or handles. Broken lines show the interior surface of the cap and the hidden portion of the wings.

FIG. 3 shows a side view of the removable and reusable closure cap 20, showing one of the opposing wings or handles 23, facing out of the drawing. The other wing or handle 23, denoted by broken lines, is facing into the drawing. The wings or handles 23, having a vertical portion 32, and a lower horizontal portion 33, that allow a user to apply pressure and twist to form a force-fit or press fit grip seal with a nozzle end of a container, preferably where the container is a caulking tube. The wings or handles also allow the user to apply a pulling force and twist to break the force-fit seal, thereby allowing the cap to be removed from the nozzle end or applicator tip of the container.

Figure 4:
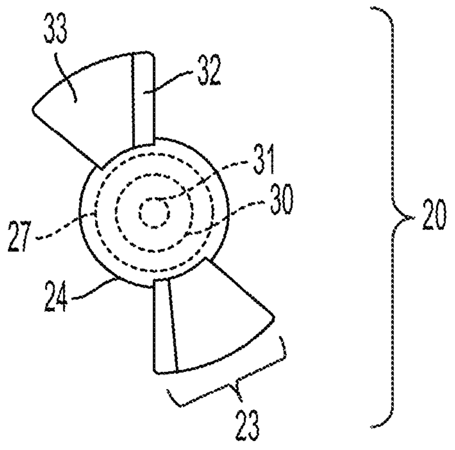
FIG. 4 shows a top view of the removable and reusable cap with wings or handles. Broken lines show the interior surface of the cap.

FIG. 4. shows a top view looking down on the removable and reusable closure cap 20, with the opposing wings or handles 23, having a vertical portion 32, facing out of the drawing and a lower horizontal portion 33, and a cylindrical lower outer portion 24. Shown using broken lines is the inner surface of the cap 20, having a cylindrical lower inner portion 27, within the cylindrical lower outer portion 24, a cylindrical diameter 30, at the top of the tapered cylindrical middle portion 28, and a cylindrical closed top 31, of the tapered cylindrical upper portion 29.

Figure 5:
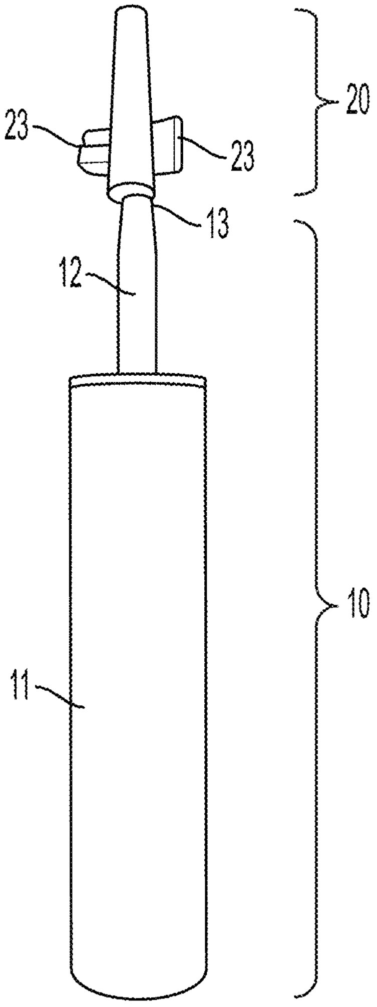
FIG. 5 shows the removable and reusable cap with wings or handles aligned with the nozzle end or applicator tip of a caulking cartridge.

FIG. 5 shows the caulking cartridge 10, nozzle end 12, aligned removed from the removable and reusable closure cap 20.

Figure 6:
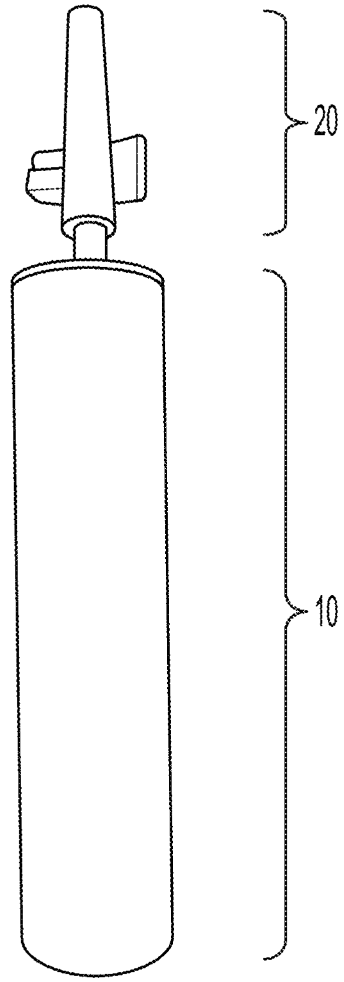
FIG. 6 shows the removable and reusable cap in a force-fit or press-fit grip configuration with the nozzle end or applicator tip of a caulking cartridge. The force-fit configuration provides an air-tight seal when the nozzle end or applicator tip has been cut, thereby preserving any unused caulk or air-curable material in the cartridge from drying out or curing.

FIG. 6 shows the caulking cartridge 10, nozzle end 12, operationally attached with the removable and reusable closure cap 20, to form a force-fit airtight seal.

Figure 7:
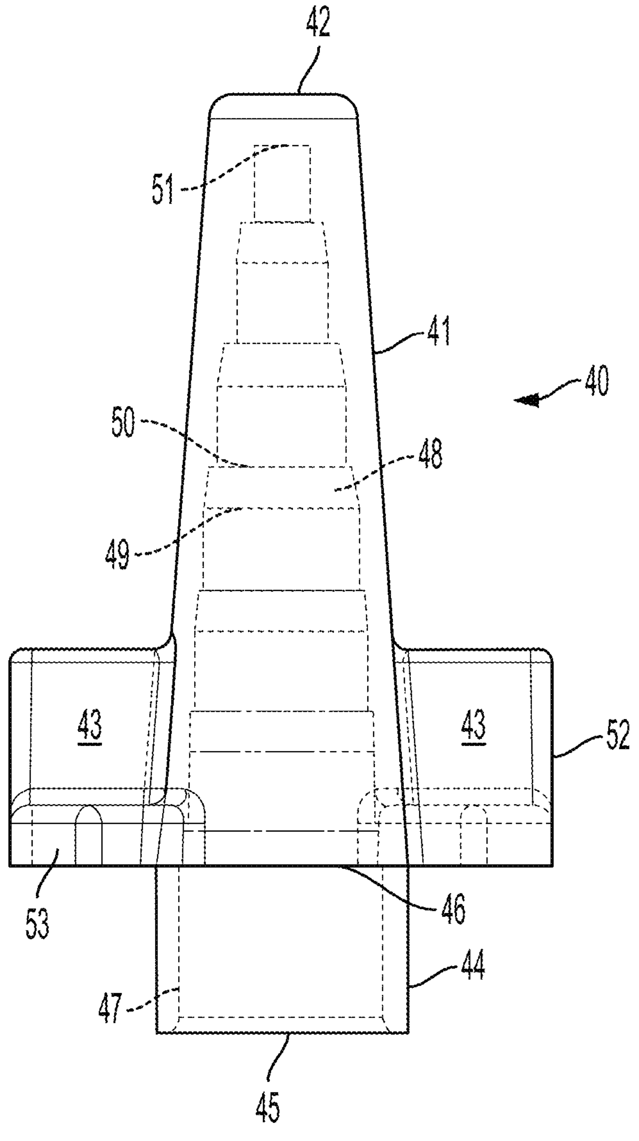
FIG. 7 shows a front view of another embodiment of a removable and reusable cap with wings or handles and internal annular ring grips. Broken lines show the interior service of the cap and the back portion of the wings.

FIG. 7 shows a front view of another embodiment of a removable and reusable closure cap 40, comprising a tapered outer upper cylindrical portion 41 with a closed top end 42, two opposing wings or handles 43, a lower outer portion 44 of uniform diameter below the opposing wings or handles 43, with an open bottom end 45 capable of receiving the nozzle end or applicator tip of a caulking cartridge. The wings or handles 43 allow a user to apply pressure or apply pressure and twist to form a force-fit or press-fit grip airtight seal between the cap 40 and a cut nozzle end or applicator tip 12, of a caulking cartridge 10. The wings or handles 43 also allow easy removal of the cap from the cut nozzle end or applicator tip by the user.

The inner surface of cap 40, denoted by broken lines, has a lower cylindrical portion 47 of uniform diameter below the opposing wings or handles 43. A series of internal annular grip rings 48, each with a bottom 49 and top 50. The diameter of each internal annular grip ring 48 has a diameter that decreases from the lower cylindrical portion 47 to the internal top portion 51. The number of internal annular grip rings 48 can vary from 3 to 10, preferably 5. The lower portion 44 has an internal surface 47.

Figure 8:
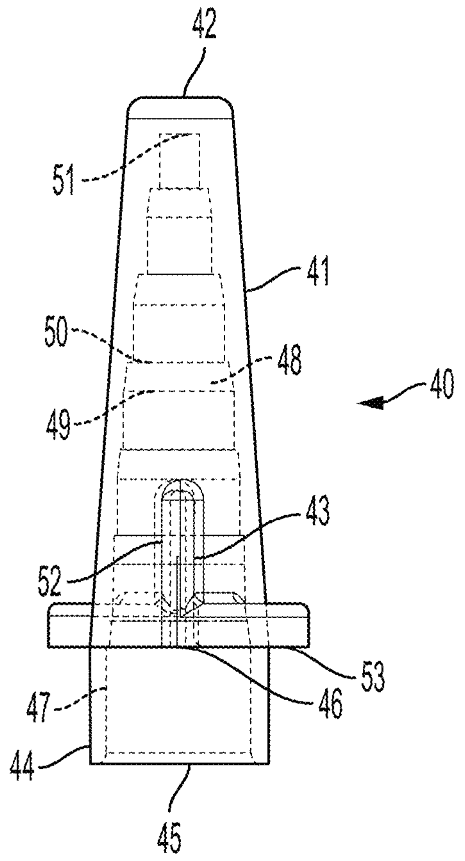
FIG. 8 shows a side view of another embodiment of the removable and reusable cap with wings or handles and internal annular ring grips. Broken lines show the interior surface of the cap and the hidden portion of the wings.

FIG. 8 shows a side view of the removable and reusable closure cap 40, showing one of the opposing wings or handles 23, facing out of the drawing. The other wing or handle 43, denoted by broken lines, is facing into the drawing. The wings or handles 43, having a vertical portion 52, and a lower horizontal portion 53, that allow a user to apply pressure and twist to form a force-fit or press fit grip seal with a nozzle end of a container, preferably where the container is a caulking tube. The wings or handles also allow the user to apply a pulling force and twist to break the force-fit seal, thereby allowing the cap to be removed from the nozzle end or applicator tip of the container.

Figure 9:
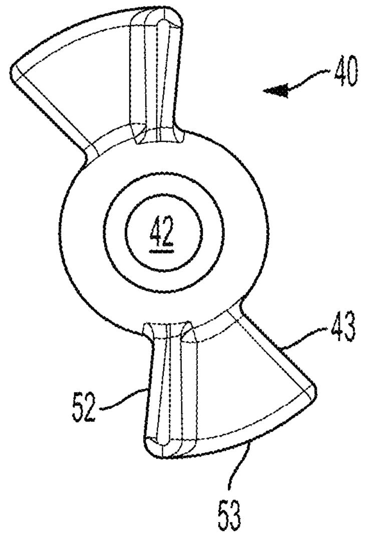
FIG. 9 shows a top view of another embodiment of the removable and reusable cap with wings or handles and internal annular ring grips. Broken lines show the interior surface of the cap.

FIG. 9. shows a top view looking down on the removable and reusable closure cap 40, with the opposing wings or handles 43.

The nozzle end or applicator tip of the container which holds air-curable flowable material, particularly a caulking tube, is designed to allow the user to cut a portion off at various locations having different diameters, allowing the user to apply the air-curable flowable material to work surfaces in amounts or thickness required for the particular task. After the user has completed applying the air-curable flowable material to the surface, any remaining air-curable flowable material in the container is exposed to air which, over time, causes the air-curable flowable material to cure or harden, making the air-curable flowable material unsuitable for future applications.

Air-curable flowable materials in the container include caulking, sealants, adhesives, and the like.

The removable and reusable closure cap, comprising an outer surface and a rough inner surface, allows for a force-fit or press-fit grip seal when applied to a cut nozzle end or applicator tip of a container containing air-curable flowable material. In one embodiment the force-fit or press-fit grip seal is an airtight seal that keeps the cap attached to the cut nozzle end or applicator tip of the container containing air-curable flowable material, until a user applies a pulling force to break the seal, thereby allowing the removal of the cap from the cut nozzle end or applicator tip. In another embodiment, the container containing air-curable flowable material is a caulking tube.

The location of the cut on the nozzle end or applicator tip of a container which contains air-curable flowable material will affect the amount of air available to react with remaining air-curable flowable material in the container after forming the force-fit or press-fit seal with the removable and reusable closure cap. The presence of trapped air may result in some curing or hardening of the remaining air-curable material.

The outer surface of the removable and reusable closure cap comprises a tapered upper cylindrical portion with a closed top end and two opposing wings or handles, and a lower cylindrical portion of uniform diameter with an open bottom end capable of receiving the cut nozzle end or applicator tip of the container containing flowable material.

In one embodiment of the outer surface of the removable and reusable closure cap, the length of the cap from the open bottom end to the closed top end is about 72 mm. The outer upper cylindrical portion is tapered at an angle of about 93° from the lower horizontal portion of the opposing wings or handles. The diameter of the cylindrical lower outer portion is about 18.5 mm while the length is about 12 mm.

In one embodiment, the rough inner surface of the removable and reusable closure cap is designed to receive a cut nozzle end or applicator tip of a container which holds air-curable flowable material, preferably a caulking tube, wherein the rough inner surface of the cap allows for a force-fit or press-fit grip seal between the cap and the cut nozzle end or applicator tip when a user applies a pressing force and twist on the wings or handles of the cap.

The rough inner surface of the removable and reusable cap has a roughness equal to the roughness achieved by fused deposition modeling (FDM) 3D printing, where the printer layer height is about 0.3 mm to about 0.5 mm. Preferably, the printer layer height is about 0.5 mm. In FDM 3D printing of the cap, printer filament is deposited on the printing surface in the form of concentric peaks. The higher the printer layer height, the greater the diameter and height of the surface concentric peaks and the greater the roughness of the cap's inner surface.

In another embodiment of the rough inner surface of the removable and reusable closure cap, the rough inner surface comprises a tapered upper cylindrical portion having a closed top end and an open bottom end, a tapered middle cylindrical portion having an open top end and an open bottom end, and a lower cylindrical portion of uniform diameter with an open top end and an open bottom end, wherein the rough inner surfaces of the cap allow for a force-fit or press-fit grip airtight seal between the cap and the cut nozzle end or applicator tip of a container which holds air-curable flowable material, preferably a caulking tube, when a user applies a pressing force and twist on the wings or handles of the cap.

In another embodiment of the rough inner surface of the removable and reusable closure cap, the rough inner surface comprises a tapered upper cylindrical portion ranging in length from about 20 mm to about 24 mm, having a closed top end with a diameter ranging from about 3.5 mm to about 4.5 mm and an open bottom end having a diameter of about 9 mm to about 11 mm, the rough inner surface tapered middle cylindrical portion ranging in length from about 30 mm to about 40 mm, having a diameter at the open top end of about 9 mm to about 11 mm and a diameter at the open bottom end of about 13 mm to about 17 mm, and a rough inner surface lower cylindrical portion of uniform diameter ranging in length of about 10 mm to about 14 mm, having a uniform diameter of about 13 mm to about 17 mm.

In another embodiment of the rough inner surface of the removable and reusable closure cap, the rough inner surface comprises a tapered upper cylindrical portion with a length of about 22 mm having a closed top end with a diameter of about 3.8 mm and an open bottom end with a diameter of about 10 mm, a tapered middle cylindrical portion having a length of about 35 mm and a diameter at the open top end of about 10 mm and a diameter at the open bottom end of about 15 mm, and a lower cylindrical portion having a length of about 12 mm and a uniform diameter of about 15 mm.

In another embodiment, the inner surface of the removable and reusable closure cap, the inner surface comprises a series of internal annular grip rings. The diameter of each internal annular grip ring has a diameter that decreases from the lower cylindrical portion to the top portion of the inner surface. The number of internal annular grip rings can vary from 3 to 10, preferably 5. The internal annular grip rings of the cap allow for a force-fit or press-fit grip airtight seal between the cap and the cut nozzle end or applicator tip of a container containing air-curable flowable material, preferably a caulking tube, when a user applies a pressing force or a pressing force and twist on the wings or handles of the cap.

In another embodiment, the removable and reusable closure cap with an inner surface comprising a series of internal annular grip rings has a length ranging from about 65 mm to about 75 mm, preferably about 69 mm, from the bottom end to the top end. The open bottom end has a diameter ranging from about 13 mm to about 17 mm, preferably about 15 mm. The opposing wings or handles on the outer surface start at about 10 mm to 15 mm, preferably about 12 mm, from the open bottom end of the cap with a height of about 14 mm to 18 mm, preferably about 16 mm.

The cap of the first embodiment and the other embodiment is removable from the cut nozzle end or applicator tip of the container containing air-curable flowable material, preferably a caulking tube, by application of a pulling force or a pulling force and twist on the wings or handles of the cap, thereby breaking the airtight seal and allowing removal of the cap. Following removal of the cap, the remaining air-curable flowable material in the container is suitable for additional applications.

The force-fit grip airtight seal between the removable and reusable cap of the first embodiment and the other embodiment and the cut nozzle end or applicator tip of container containing air-curable flowable material, preferably a caulking tube, allows any remaining air-curable flowable material in the container to be stable for at least 1 month, preferably 6 months. The remaining air-curable flowable material is suitable for application to a work surface after removal of the cap from the cut nozzle end or applicator tip of the container.

The removable and reusable closure caps with a rough inner surface or an inner surface with internal annular grip rings allow for a method of preventing or inhibiting air curable flowable material in a container with a cut nozzle end or applicator tip from curing upon exposure to air by forming a force-fit or press-fit grip airtight seal between the removable cap and the cut nozzle end or applicator tip of the container.

In another embodiment, the method of preventing or inhibiting air curable flowable material in a container with a cut nozzle end or applicator tip from curing upon exposure to air is by forming a force-fit or press-fit grip airtight seal between the removable cap and the cut nozzle end or applicator tip of the container, wherein the removable cap comprises an outer surface with opposing wings or handles and a rough inner surface or an inner surface with internal annular grip rings.

The outer surface comprises a tapered upper cylindrical portion with a closed top end and two opposing wings or handles, and a lower cylindrical portion of uniform diameter with an open bottom end capable of receiving the cut nozzle end or applicator tip of the container containing air-curable flowable material.

In one embodiment, the inner surface of the removable and reusable closure cap is a rough inner surface comprising a tapered upper cylindrical portion having a closed top end and an open bottom end, a tapered middle cylindrical portion having an open top end and an open bottom end, and a lower cylindrical portion of uniform diameter with an open top end and an open bottom end, wherein the rough inner surfaces of the cap allow for a force-fit or press-fit grip airtight seal of the cap to the cut nozzle end or applicator tip of the container containing air-curable flowable material when a user applies a pressing force and twist on the wings or handles of the outer surface of the cap, and wherein the cap is removable from the cut nozzle end or applicator tip of the container by application of a pulling force and twist on the wings or handles of the outer surface of the cap thereby breaking the airtight seal and allowing removal of the cap. After removal of the cap, the remaining air-curable flowable material in the container is suitable for application through the cut nozzle end or applicator tip to a work surface.

In another embodiment, the inner surface of the removable and reusable closure cap comprises a series of internal annular grip rings. The diameter of each internal annular grip ring has a diameter that decreases from the lower cylindrical portion to the top portion of the inner surface. The internal annular grip rings of the cap allow for a force-fit or press-fit grip airtight seal of the cap to the cut nozzle end or applicator tip of the container containing air-curable flowable material when a user applies a pressing force or a pressing force and twist on the wings or handles of the outer surface of the cap. The cap is removable from the cut nozzle end or applicator tip of the container by application of a pulling force or pulling force and twist on the wings or handles of the outer surface of the cap, thereby breaking the airtight seal and allowing removal of the cap. After removal of the cap, the remaining air-curable flowable material in the container is suitable for application through the cut nozzle end or applicator tip to a work surface.

The removable caps of the embodiments of the invention can be used one or more times to form a force-fit or press-fit grip airtight seal of the cut nozzle end or applicator tip of containers containing air-curable flowable material.

The removable and reusable caps of the embodiments of the invention can be prepared by additive manufacturing or 3D printing. In manufacturing the presently disclosed removable and reusable cap, the 3D printing is a fused deposition modeling (FDM) 3D printing process.

Filaments useful for FDM 3D printing include polylactic acid (PLA), polyethylene terephthalate glycol (PETG), acrylonitrile styrene acrylate (ASA), acrylonitrile butadiene styrene (ABS), polycarbonate (PC), co-polyester based on terephthalic acid (CPE), and polypropylene (PP). The choice of filament will depend on the item being manufactured, cost, and use. In the case of the presently disclosed removable and reusable closure cap, the filament for FDM 3D printing suitable for forming a force-fit or press-fit air-tight seal of a cut nozzle end of a container containing air-curable flowable materials is PETG. The filament prints in a range of 220° C. to 260° C. PETG produces a cap that is durable, lightweight, chemical resistant, and food safe. The PETG is available in a variety of colors that allow the user to select the color or color combination of the manufactured product.

The thickness of layers (printer layer height) in FDM 3D printing can be set to about 100 micrometers to about 500 micrometers. The smaller the thickness of the printer layer height, the longer the time to complete manufacturing of the cap. The printer layer height also affects the roughness of the inner surface area of the manufactured cap. For example, the inventor found that having a printer layer height of about 200 micrometers, the manufactured cap was not able to form a suitable force-fit or press-fit grip seal with the cut nozzle end of a caulking tube, while a printer layer height of about 300 micrometers to about 500 micrometers did produce a manufactured cap with a rough inner surface that allowed for a force-fit or press-fit grip seal with the cut nozzle end of a caulking tube. A printer layer height of 500 micrometers resulted in the air-curable caulk in a cut nozzle end of a caulking tube being stable for at least 6 months.

Alternatively, the removable and reusable cap of the embodiments of the invention may be manufactured by an injection molding process, a manufacturing method that is well known by persons skilled in the art. Injection molding can also be used to produce a rough inner surface in the cap or internal annular grip rings. The advantage of injection molding is the time and cost of producing the removable and reusable closure caps of the presently disclosed invention. Low-density polyethylene can be used to form the caps of the embodiments of the invention. The removable and reusable closure caps can be prepared with a variety of colors.

Examples

Example 1. 3D Additive Manufacturing of a Removable and Reusable Cap. The removable and reusable cap can be prepared by additive manufacturing or 3D printing. In manufacturing the presently disclosed removable and reusable cap, the 3D printing is a fused deposition modeling (FDM) 3D printing process. An example of a 3D printer suitable for FDM 3D printing is the Prusa Mk2 (Prusa Research, Prague, Czech Republic). Other FDM 3D printers can also be used.

The process of manufacturing the cap using FDM 3D printing in general involves the following steps.

1. The first step to creating a 3D printed cap is creating a virtual design using a computer-aided design (CAD) with computer software or a 3D scanner. On this, the exact dimensions of the cap are simulated to see how this will look when finishing the 3D printing.
2. Once the design is created, the next thing is to convert the file into a format that can be read by the 3D printer. One of the most common files used is STL (standard tessellation language).
3. Once the STL file is created and ready to be sent to the 3D printer, the orientation and size for the object to be printed is set. STL files also allow the user to repair any inconsistencies in the original.
4. Once the digital file is ready to be printed, all materials including the chosen filament need to be ready as well in order to start the printing process. Once the STL file is ready, it must be processed by slicing software into G-code, The G-code in the 3D printing process converts the cap into layers and provides the instructions that later will be received by the 3D printer.
5. Once all the mentioned parameters are ready, the printing process can begin. When the process begins, the layers start to build the cap with an incomparable resolution using a special measure of micrometers.
6. At the completion of building the cap, the cap is removed from the printer.

Example 2. Stability of Air-Curable Materials. The removable and reusable closure cap of the present invention with a rough inner surface was applied in a force-fit or press-fit seal of the cut nozzle end of tube of painter's caulk at about half empty. The sealed painter's caulk tube was set aside for about 6 months. After removal of the cap, the remaining caulk in the tube was still flowable with no evidence of solidification and was suitable for use in work projects. A similar test was done with a tube containing construction adhesive which is more volatile, and the unused adhesive was stable for 6 months and suitable for use in work projects.

The invention claimed is:

1. A removable cap for sealing a cut caulking tube nozzle of a caulking tube containing air curable caulk, the cap comprising an outer surface and an inner surface:

the outer surface comprises a tapered upper cylindrical portion with a closed top end and two opposing wings or handles, and a lower cylindrical portion of uniform diameter with an open bottom end capable of receiving the cut caulking tube nozzle of the caulking tube; and the inner surface comprises a plurality of spaced apart internal annular grip rings, each of said grip rings runs parallel and horizontal to another of the plurality of grip rings that decrease in diameter from the bottom of the opposing wings or handles to the top of the cap and the lower cylindrical portion of uniform diameter with an open bottom end, wherein the internal annular grip rings of the cap allow for a force-fit or press-fit grip airtight seal of the cap to the cut caulking tube nozzle when a user applies a pressing force on the wings or handles of the outer surface of the cap, and wherein the cap is removable from the cut caulking tube nozzle by application of a pulling force on the wings or handles of the outer surface of the cap thereby breaking the airtight seal and allowing removal of the cap; and wherein the lower cylindrical portion of uniform diameter comprises a lower portion with an inner and outer surface, and the lower portion extending below the two opposing wings or handles to first receive the cut calking tube nozzle, and the two opposing wings or handles extending radially beyond the outer surface of the lower portion.

2. The removable cap of claim 1, wherein the number of internal annular grip rings range from 3 to 10.

3. The removable cap of claim 1, wherein the height of the cap ranges from about 65 mm to 75 mm and the internal diameter of the open bottom end ranges from about 13 mm to 17 mm.

4. The removable cap of claim 3, wherein the height of the cap is about 69 mm and the internal diameter of the open bottom end is about 15 mm.

5. The removable cap of claim 1, wherein the force-fit airtight seal between the removable cap and the cut caulking tube nozzle allows for the air-curable caulk in the caulking tube to be stable for at least 1 month for application to a work surface after removal of the cap from the cut caulking tube nozzle.

6. The removable cap of claim 1, wherein the cut caulking tube nozzle has a variable diameter depending on the location of the cut on the caulking tube nozzle.

7. A method of preventing any remaining air-curable flowable material in a container with a cut nozzle end or applicator tip from curing upon exposure to air comprising forming a force-fit or press-fit grip airtight seal between a removable cap and the cut nozzle end or applicator tip of the container, wherein the removable cap comprises an outer surface and an inner surface:

the outer surface comprises a tapered upper cylindrical portion with a closed top end and two opposing wings or handles, and a lower cylindrical portion of uniform diameter with an open bottom end capable of receiving the cut nozzle end or applicator tip of the container containing air-curable flowable material; and the inner surface comprises a plurality of spaced apart internal annular grip rings, each of said grip rings runs parallel and horizontal to another of the plurality of grip rings that decrease in diameter from the bottom of the opposing wings or handles to the top of the cap and the lower cylindrical portion of uniform diameter with an open bottom end, wherein the internal annular grip rings of the cap allow for a force-fit or press-fit grip airtight seal of the cap to the cut caulking tube nozzle when a user applies a pressing force on the wings or handles of the outer surface of the cap;

wherein the cap is removable from the cut caulking tube nozzle by application of a pulling force on the wings or handles of the outer surface of the cap thereby breaking the airtight seal and allowing removal of the cap, and wherein the remaining air-curable flowable material in the container after removal of the cap is suitable for application through the cut nozzle end or applicator tip to a work surface; and wherein the lower cylindrical portion of uniform diameter comprises a lower portion with an inner and outer surface, and the lower portion extending below the two opposing wings or handles to first receive the cut calking tube nozzle, and the two opposing wings or handles extending radially beyond the outer surface of the lower portion.

8. The method of claim 7, wherein the removable cap is used one or more times to form a force-fit or press-fit grip airtight seal of the cut nozzle end or applicator tip of the container containing air-curable flowable material.

9. The method of claim 7, wherein the number of internal annular grip rings range from 3 to 10.

10. The method of claim 7, wherein the force-fit airtight seal allows for the air-curable flowable material in the container to be stable for at least 1 month for application to a work surface after removal of the cap from the cut nozzle end or applicator tip.

11. The method of claim 7, wherein the force-fit airtight seal allows for the air-curable flowable material in the container to be stable for at least 6 months for application to a work surface after removal of the cap from the cut nozzle end or applicator tip.

12. The method of claim 7, wherein the cut nozzle end or applicator tip has a variable diameter depending on the location of the cut on the nozzle end or applicator tip of the container.

13. The method of claim 7, wherein the air-curable flowable material comprises a caulk, adhesive, or silicone.

14. A removable cap for forming a force-fit airtight seal when applied to a cut nozzle end or applicator tip of a container containing air-curable flowable material, the cap comprising an outer surface and an inner surface:

the outer surface comprises a tapered upper cylindrical portion with a closed top end and two opposing wings or handles, and a lower cylindrical portion of uniform diameter with an open bottom end capable of receiving the cut nozzle end or applicator tip of the container containing air-curable flowable material; and the inner surface comprises a plurality of spaced apart internal annular grip rings, each of said grip rings runs parallel and horizontal to another of the plurality of grip rings that decrease in diameter from the bottom of the opposing wings or handles to the top of the cap and the lower cylindrical portion of uniform diameter with an open bottom end, wherein the internal annular grip rings of the cap allow for a force-fit or press-fit grip airtight seal of the cap to the cut nozzle end or applicator tip of a container containing air-curable flowable material when a user applies a pressing force on the wings or handles of the outer surface of the cap, and wherein the cap is removable from the cut nozzle or applicator tip of the container containing air curable material by application of a pulling force on the wings or handles of the outer surface of the cap thereby breaking the airtight seal and allowing removal of the cap thereby allowing any of the air-curable flowable material in the container to be applied a work surface; and wherein the lower cylindrical portion of uniform diameter comprises a lower portion with an inner and outer surface, and the lower portion extending below the two opposing wings or handles to first receive the cut calking tube nozzle, and the two opposing wings or handles extending radially beyond the outer surface of the lower portion.

15. The removable cap of claim 14, wherein the number of internal annular grip rings range from 3 to 10.

16. The removable cap of claim 14, wherein the force-fit or press-fit grip airtight seal allows for the air-curable flowable material in the container to be stable for at least 1 month for application to a work surface after removal of the cap from the cut nozzle end or applicator tip.

17. The method of claim 14, wherein the force-fit or press-fit grip airtight seal allows for the air-curable material in the container to be stable for at least 6 months for application to a work surface after removal of the cap from the cut nozzle end or applicator tip.

* * * * *